United States Patent
Bansal et al.

(10) Patent No.: US 12,256,039 B2
(45) Date of Patent: Mar. 18, 2025

(54) MAINTAINING SERVICE AVAILABILITY

(71) Applicant: Salesforce, Inc., San Francisco, CA (US)

(72) Inventors: Kaushal Bansal, San Francisco, CA (US); Prabhat Singh, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 276 days.

(21) Appl. No.: 18/080,068

(22) Filed: Dec. 13, 2022

(65) Prior Publication Data

US 2024/0195908 A1    Jun. 13, 2024

(51) Int. Cl.
*H04M 1/24* (2006.01)
*G06F 8/30* (2018.01)
*H04M 3/08* (2006.01)
*H04M 3/22* (2006.01)

(52) U.S. Cl.
CPC ............ *H04M 3/2209* (2013.01); *G06F 8/31* (2013.01)

(58) Field of Classification Search
CPC ............................... H04M 3/2209; G06F 8/31
See application file for complete search history.

(56) References Cited

U.S. PATENT DOCUMENTS

| | | | |
|---|---|---|---|
| 11,442,896 B2 * | 9/2022 | Agrawal | G06F 11/1435 |
| 2004/0225952 A1 * | 11/2004 | Brown | G06F 8/20 |
| | | | 714/819 |
| 2020/0274900 A1 * | 8/2020 | Vaishnavi | H04L 63/20 |
| 2023/0013110 A1 * | 1/2023 | Singh | H04L 49/1523 |
| 2023/0069844 A1 * | 3/2023 | Chandrasekaran | H04L 7/033 |
| 2023/0145025 A1 * | 5/2023 | Qureshi | G06F 9/5094 |
| | | | 718/100 |

* cited by examiner

*Primary Examiner* — Simon King
(74) *Attorney, Agent, or Firm* — Butzel Long

(57) ABSTRACT

Systems, devices, and techniques are disclosed for maintaining service availability. Files including code written using a Domain Specific Language (DSL) for network security may be received. A knowledge graph including connections between services may be generated from the code written using the DSL in the files. A service that will have an availability issue may be determined based on the connections between services in the knowledge graph. The service that will have the availability issue may be replicated. The replication of the service that will have the availability issue may occur before the service has the availability issue.

20 Claims, 8 Drawing Sheets

MAINTAINING SERVICE AVAILABILITY

BACKGROUND

An intent based domain specific language (DSL) may be used to define security policies for an application, such as a Software-as-a-Service (SaaS) application, running on a cloud computing server system. The DSL may be designed for use by developers of the application, who may not have detailed knowledge of network security. A service of the cloud computing server system may interpret policies defined using DSL to generate cloud native enforcement artifacts, which may be machine-readable files that specify network security policies in a manner that is useable by the cloud computing server system on which the policies are being enforced. This may make it difficult to evaluate service reliability, as the connections between servers may not be directly specified in the DSL and may be difficult for person to discern from the cloud native enforcement artifacts.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
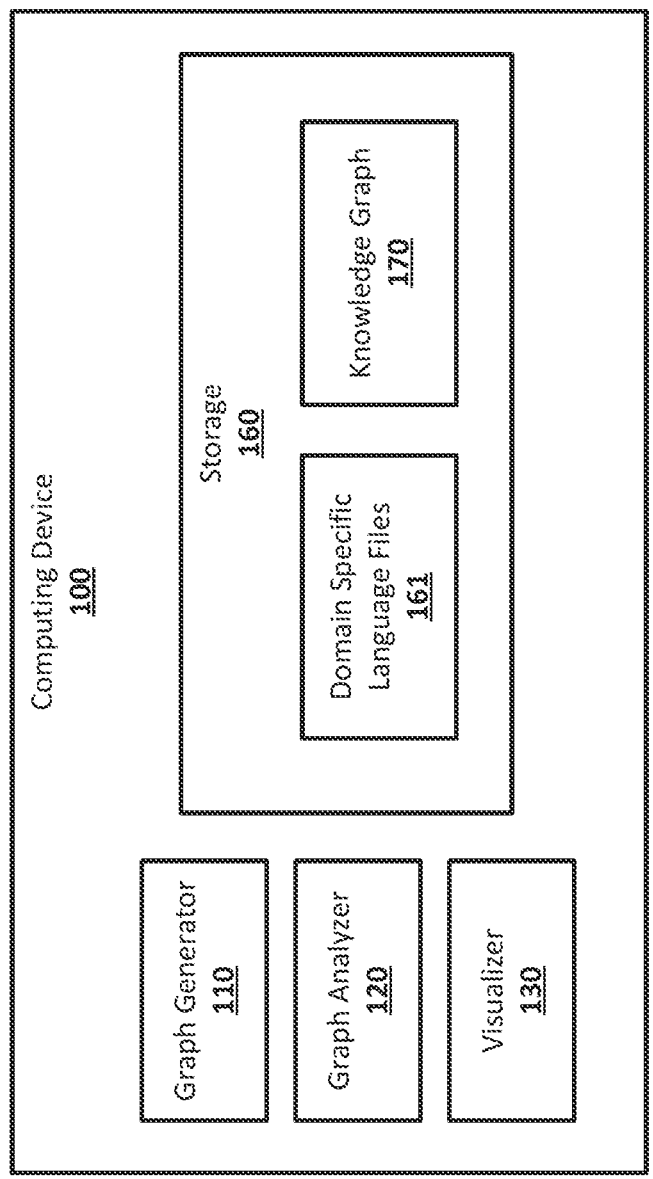
FIG. 1 shows an example system suitable for maintaining service availability according to an implementation of the disclosed subject matter.

Techniques disclosed herein allow for maintaining service availability, which may allow for the viewing of connections between services and determining availability issues that may affect services. Files including code written using a Domain Specific Language (DSL) for network security may be received. A knowledge graph including one or more connections between services may be generated from the code written using DSL in the files. That a service will have an availability issue may be determined from the knowledge graph based on the connections between services in the knowledge graph. The service that will have the availability issue may be replicated. The replication may occur before the service has the availability issue.

Files including code written using a DSL for network security may be received. A DSL may be used by a developer of an application, such as a Software-as-a-Service (Saas) application, to write code that defines the network security policies that will be needed by the application. The DSL may be an intent-based language. The policies described using a DSL may include, for example, the types of services on a cloud computing server system the application will need access to in order to run properly on the cloud computing server system. For example, a SaaS application running on a cloud computing server system may need to be able to communicate with other SaaS applications running on that cloud computing server system. The services may be any suitable types of services that may perform any suitable functions and may be communicated with in any suitable manner, including, for example, through APIs. The code written in DSL for such a SaaS application may specify the need for this type of network access, for example, identifying the other SaaS applications that will be communicated with. The code written in DSL for an application may be stored in a file which may be received at the cloud computing server system on which the application is installed, for example, along with the installation of the application.

A knowledge graph including one or more connections between services may be generated from the code written using DSL in the files. The knowledge graph may be a graph representing connections between service instances on the cloud computing server system based on the policies that were defined using DSL. The knowledge graph may include representations of both service instances and the policies that result in the connection between the services. This may allow for the knowledge graph to be used to determine both which instances of the services are connected to each other and policies resulted in those connections. Because the cloud computing server system may operate on a zero-trust system for network security, the only connections between service instances on the cloud computing server system may be those that result from implementation of network security policies defined in the DSL of the received files for the applications running on the cloud computing server system. The connections between service instances may be one-to-one or many-to-one connections. The knowledge graph may be generated by, for example, a graph generator service. The knowledge graph may include any suitable data about the connections between service instances, including, for example, names of service instances and ports used in the connection between services. The knowledge graph for service instances on a cloud computing server system may be generated at any suitable time. For example, the knowledge graph may be generated on-demand, in an ad hoc manner, or may be updated live after being initially generated. The knowledge graph may be stored in a persistent storage. The knowledge graph may be stored in any suitable persistent storage of the cloud computing server system or any other suitable computing device or system. This may allow the knowledge graph to be accessed for use in maintaining service availability.

That a service will have an availability issue may be determined from the knowledge graph based on the connections between services in the knowledge graph. Any suitable graph analytics may be run on the knowledge graph. The analytics may be run, for example, on the cloud computing server system, or may be run on a separate computing device or system, for example, to avoid impacting the performance of the cloud computing server system. The graph analytics may include, for example, centrality or page rank analysis that may identify which service instances represented in the knowledge graph are the most critical based on the number of edges going into a node representing the service instance in knowledge graph. The graph analytics may be used to determine if any of the service instances running on the cloud computing server system and represented in the knowledge graph may have availability issues. The availability issues for a service instance may be determined before the issues occur, allowing for preventative action to be taken before a service's availability is impacted. The availability issues may be detected by, for example, determining from the graph analytics that a single service instance may have too many incoming connections from other service instances which could result in the service instance being overrun or otherwise having an outage. For example, every service instance may have a threshold number of incoming connections that the service instance may be able to handle before having availability issues, which may depend on, for example, the volume and frequency of incoming traffic over connections to the service instance and the computational resources needed by the service to appropriately handle the incoming traffic, including providing appropriate responses to requests in incoming traffic. A service instance may be determined to have an availability issue if the service instance has more incoming connections than the threshold number of connections as determined through performing graph analytics on the knowledge graph.

The service that will have the availability issue may be replicated. The service that will have the availability issue may be replicated before the service has the availability issue. For example, once the graph analytics performed on the knowledge graph have determined that a service instance may have an availability issue due to having too many incoming connections from other service instances, the potential availability issue may be reported to an appropriate component of the cloud computing server system, such as for example, the service owner, which may be the application or application instance that started the service instance. The service instance may then be replicated on the cloud computing server system, generating a replica service instance. For example, the application that started the service instance may start a replica service instance. The replicate service instance may provide the same service as the service instance of which it is a replica. This may allow some of the incoming connections to the service instance to instead be connected to the replica service instance, thereby preventing future availability problems with the service instance before they occur. The determination that a service instance may have a future availability issue and generation of a replica service instance may occur automatically within the cloud computing server system without requiring any user input. This may allow for service availability issues for service instances in the cloud computing system to be preempted before the issues occur, and in some implementations before the services have started running on the cloud computing server system.

Historical versions of the knowledge graph may be stored. Whenever the knowledge graph for the service instances on a cloud computing server system is updated or re-generated, the previous version of the knowledge graph may be stored. This may allow for changes in the knowledge graph over time to be view and analyzed. The changes in the knowledge graph may reflect changes in the service instances that are running are the changes network security policies that control the connections between service instances. The change in network security policy may be caused by actions from service owners. The historical versions of the knowledge graph may allow for such changes to be visualized both historically and between any two versions of the knowledge graph.

The knowledge graph may be used to visualize traffic paths for a service instance across both functional domains and functional instances of the cloud computing server system. Because the cloud computing server system may use a zero-trust policy, the only connections between service instances may be those allowed by policies set according to the files with DSL code for the applications installed on the cloud computing server system. The policies may thus allow for the traffic paths between services to be visualized.

The knowledge graph may also allow for the generation of a graph of connections of various functional instances and functional domains. How changes made in the functional domain definitions may map to policies for all functional instances and functional domains may be extrapolated using the knowledge graph.

The knowledge graph may allow for the blast radius of service outages within the cloud computing server system to be visualized and may also allow for automated detection of the root cause of such service outages. For example, the connections between service instances in the knowledge graph may allow for the determination of which other service instances may be affected in the event that a particular service instance fails or becomes unreachable due to network issues, and for the failure of service instances to be traced back to the root cause of the failure. The knowledge graph may allow for visibility into and blocking of unauthorized lateral movements. The knowledge graph may allow for the identification of circular paths of connectivity, indicating circular dependency, among service instances. When circular paths are identified, attempts to remedy them may be instance specific in order to prevent chain events which can bring down the cloud computing server system.

FIG. 1 shows an example system for maintaining service availability according to an implementation of the disclosed subject matter. A computing device 100 may be any suitable computing device, such as, for example, a computer 20 as described in FIG. 7, or component thereof, for maintaining service availability. The computing device 100 may include a graph generator 110, a graph analyzer 120, a visualizer 130, and a storage 160. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The graph generator 110 may be any suitable combination of hardware and software of the computing device 100 for generating a knowledge graph from code written in DSL.

For example, the graph generator 110 may be a service running on the computing device 100 that may be a component of a policy generator used to generate cloud native enforcement artifacts from code written in DSL. Domain specific language files 161 may include code written in a DSL that define network security policies for applications, such as SaaS applications, that may be run on a cloud computing server system that may include the computing device 100. The graph generator 110 may generate a knowledge graph 170 from the domain specific language files 161. The knowledge graph 170 may be graph data that represents the service instances that the applications will run, the connections between these service instances that will be permitted by the network security policies that are defined in the domain specific language files 161, and the relationship between these network security policies and the connections that they permit. For example, the knowledge graph 170 may include, for each service instance, graph data that represents the service instance, all of the connections between that service instance and other service instances, and the polices that permit those connections. The graph generator 110 may generate the knowledge graph 170 at any suitable time and intervals or based on the occurrence of any suitable events, on an ad-hoc, continual, or on-demand basis. For example, the graph generator 110 may re-generate the knowledge graph 170 whenever there is a change to the domain specific language files 161, for example, through addition or removal of an application from the cloud computing server system or through a change in the network security policies or services instances for an already running application.

The graph analyzer 120 may be any suitable combination of hardware and software for performing graph analytics on a knowledge graph. For example, the graph analyzer 120 may perform graph analytics on the knowledge graph 170. The graph analytics performed by the graph analyzer 120 may include, for example, an analysis of the incoming connections to service instances as represented in the knowledge graph 179, which may be used to determine if any of the service instances running on the cloud computing server system and represented in the knowledge graph 170 may have current or future availability issues. The graph analyzer 120 may perform graph analytics on the knowledge graph 170 at any suitable time and intervals or based on the occurrence of any suitable events, on an ad-hoc, continual, or on-demand basis. The availability issues for a service instance may, for example, be determined before the issues occur, allowing for preventative action to be taken before a service's availability is impacted. The availability issues may be detected by, for example, determining from the graph analytics that a single service instance may have too many incoming connections from other service instances which could result in the service instance being overrun or otherwise having an outage. For example, each service instance may have a threshold number of incoming connections that the service instance may be able to handle before the service instance fails or becomes unavailable to new incoming connections based on the type of service being provided and the computational resources available to the service instance. Because the knowledge graph 170 may be generated from the domain specific language files 161 before the security policies specified in the domain specific language files 161 are implemented, the graph analyzer 120 may be able to detect a future availability issue for a service instance before that service instance starts running.

The visualizer 130 may be any suitable combination of hardware and software for generating a visualization of a knowledge graph. For example, the visualizer 130 may generate a graph based on the knowledge graph 170. The graph may be a visual representation of the service instances and connections between them, and policies that allow those connections, as included in the knowledge graph 170. The visualizer 130 may generate a graph at any suitable time, for example, based on a user request.

The storage 160 may be any suitable combination of hardware and software for storing data. The storage 160 may include any suitable combination of volatile and non-volatile storage hardware and may include components of the computing device 100 and hardware accessible to the computing device 100, for example, through wired and wireless direct or network connections. The storage 160 may store, for example, the domain specific language files 161 and the knowledge graph 170.

Figure 2:
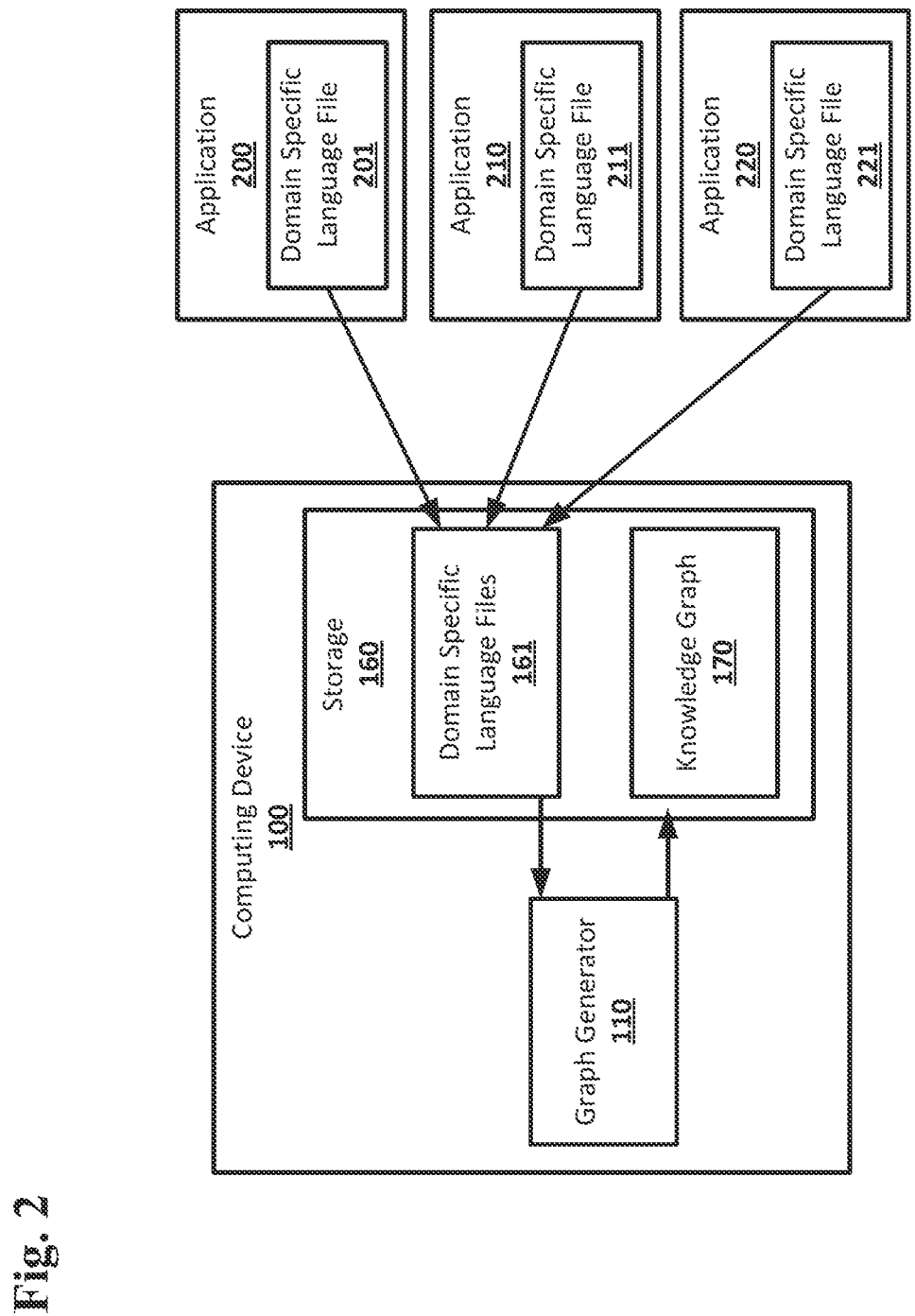
FIG. 2 shows an example arrangement suitable for maintaining service availability according to an implementation of the disclosed subject matter.

FIG. 2 shows an example arrangement suitable for maintaining service availability according to an implementation of the disclosed subject matter. Applications 200, 210, and 220 may be instances of applications, for example, SaaS applications, set up on any suitable computing device or system, for example, a cloud computing server system. Each of the applications 200, 210, and 220 may include, as one of its files, a respective domain specific language file 201, 211, and 221, which may include code, written in DSL, that defines network security policies for its respective application 200, 210, or 220. The domain specific language files 201, 211, and 221 may be stored as the domain specific language files 161 in the storage 160 of the computing device 100 as part of the installation of the applications 200, 210, and 220, for example, as application instances, on a cloud computing server system of which the computing device 100 may be a part.

The graph generator 110 may generate the knowledge graph 170 from the domain specific language files 161. The knowledge graph 170 may be generated based on the network security policies defined by the code in the domain specific language files 161. The polices, which may be generated based on the code in the domain specific language files 161, may indicate which connections are allowed between service instances running as part of the applications 200, 210, and 220, or any other already set-up applications whose domain specific language files may be part of the domain specific language files 161. The knowledge graph 170 may include graph data representing the connections between service instances and the policies that permit those connections.

Figure 3A:
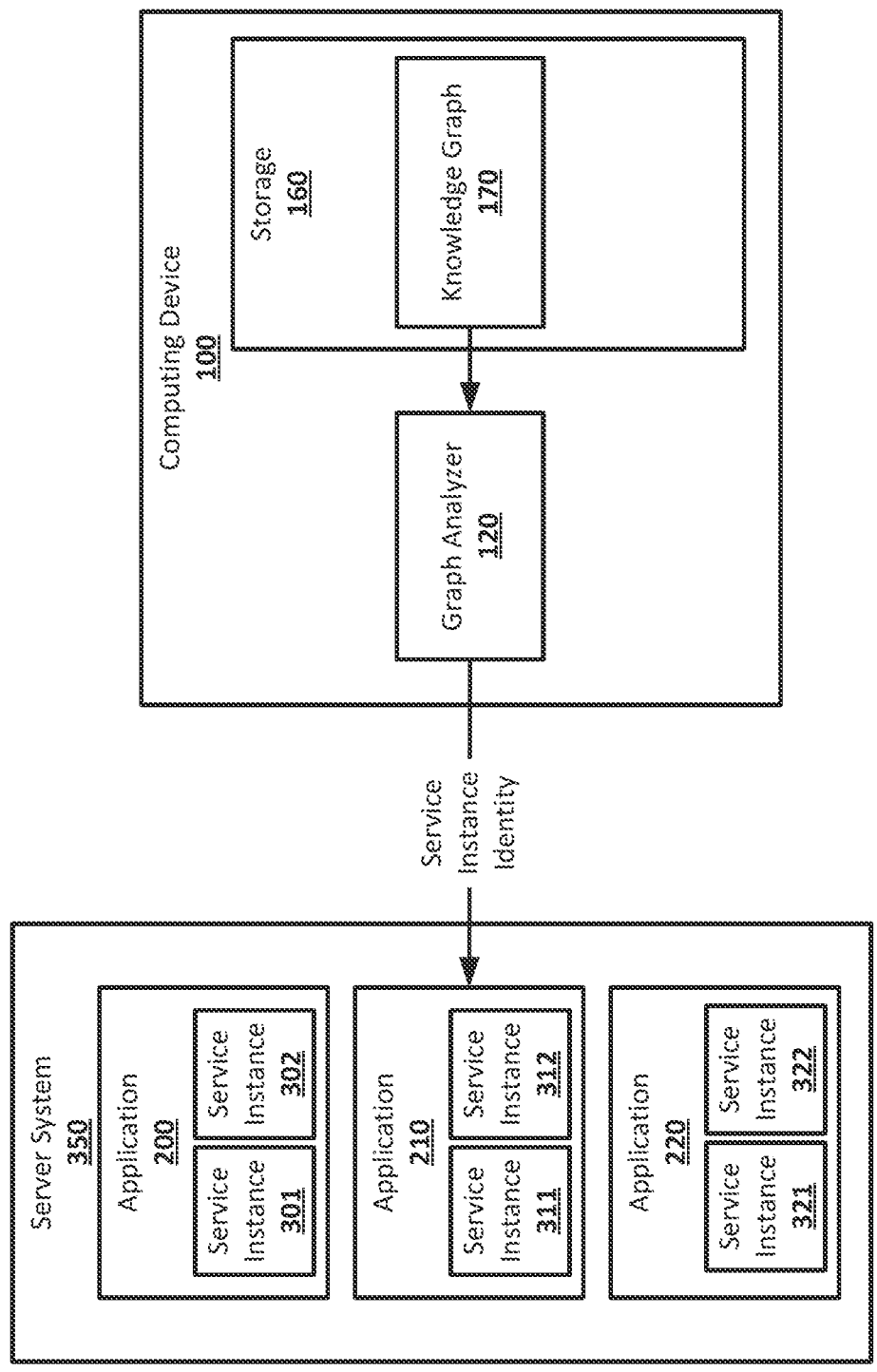
FIG. 3A shows an example arrangement suitable for maintaining service availability according to an implementation of the disclosed subject matter.

FIG. 3A shows an example arrangement suitable for maintaining service availability according to an implementation of the disclosed subject matter. The graph analyzer 120 may perform graph analytics on the knowledge graph 170. The graph analyzer 120 may, through the graph analytics, determine if any of the service instances represented in the knowledge graph 170 may experience availability issues, for example, due to the number of incoming connections to the service instance. The identity of any service instance that may experience a availability issue may be sent to the application that runs that service instance so that action may be taken to mitigate the availability issue.

For example, the applications 200, 210, and 220 may be set up on a server system 350, which may be, for example, a cloud computing server system. Service instances 301 and 302 may run as part of the application 200, service instances 311 and 312 may run as part of the application 210, and service instances 321 and 322 may run as part of the application 220. The connections permitted to and from the service instances 301, 302, 311, 312, 321, and 322 may be based on the policies defined in the domain specific language files 201, 211, and 221, and any other domain specific language files in the domain specific language files 161. The knowledge graph 170, generated by the graph generator 110, may represent the connections between the service instances 301, 302, 311, 312, 321, and 322 and any other service instances running on the server system 350 and the policies that allow those connections. The graph analyzer 120, in performing graph analytics on the knowledge graph 170, may be able to be determine any availability issues that may occur for any of the service instances 301, 302, 311, 312, 321, and 322. The graph analyzer 120 may determine that service instance 311 may experience a availability issue, for example, due to having too many incoming connection from other service instances on the sever system 350. For example, the number of incoming connections to the service instance 311 may exceed a threshold number of connections that the service instance 311 can handle while maintaining availability based on the computational needs of the service provided by the service instance 311 and the computational resources available to the service instance 311, including, for example, processing, storage, and network bandwidth resources. The graph analyzer 120 may send the identity of the service instance 311 to the application 210.

Figure 3B:
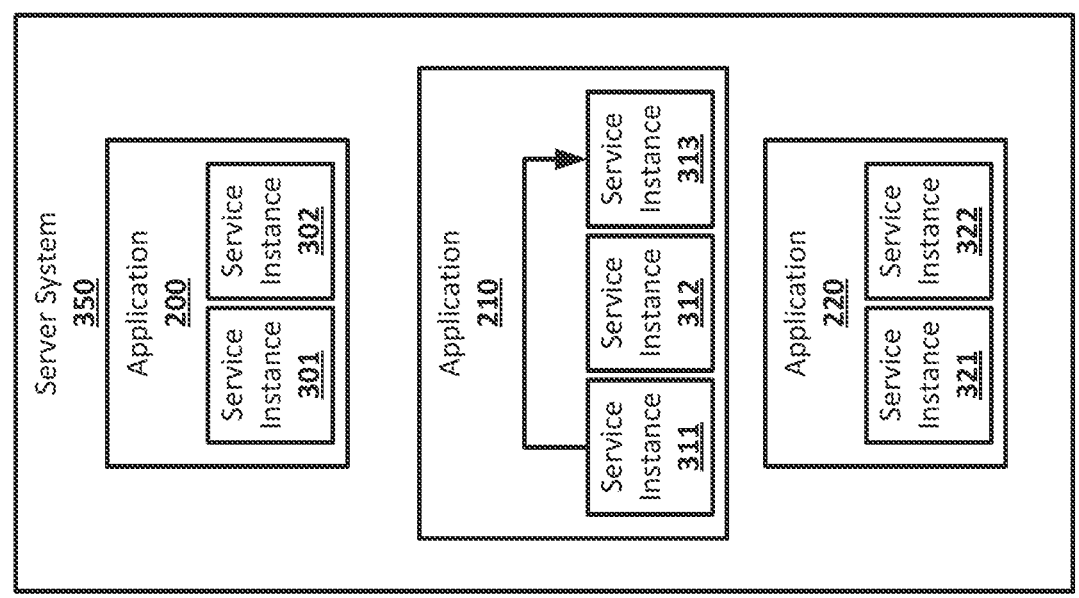
FIG. 3B shows an example arrangement suitable for maintaining service availability according to an implementation of the disclosed subject matter.

FIG. 3B shows an example arrangement suitable for maintaining service availability according to an implementation of the disclosed subject matter. An application that receives an indication that one of its service instances may experience an availability issue, along with the identity of that service instance, may replicate that service instance to prevent the availability issue. For example, the application 210 may receive an indication from the graph analyzer 120 that the service instance 311 may experience availability issues. The application 210 may replicate the service instance 311 as the service instance 313. The service instance 313 may be a replica service instance that may provide the same service as the service instance 311, and some portion of incoming traffic to the service instance 311 may be redirected to the service instance 313 to prevent overloading and failure of the service instance 311. This may occur before the service instance 311 fails, including, for example, before the service instance 311 has even started running, as the availability issues for the service instance 311 may have been determined based on the knowledge graph 170, rather than on actual traffic to or usage of the service instance 311.

Figure 4:
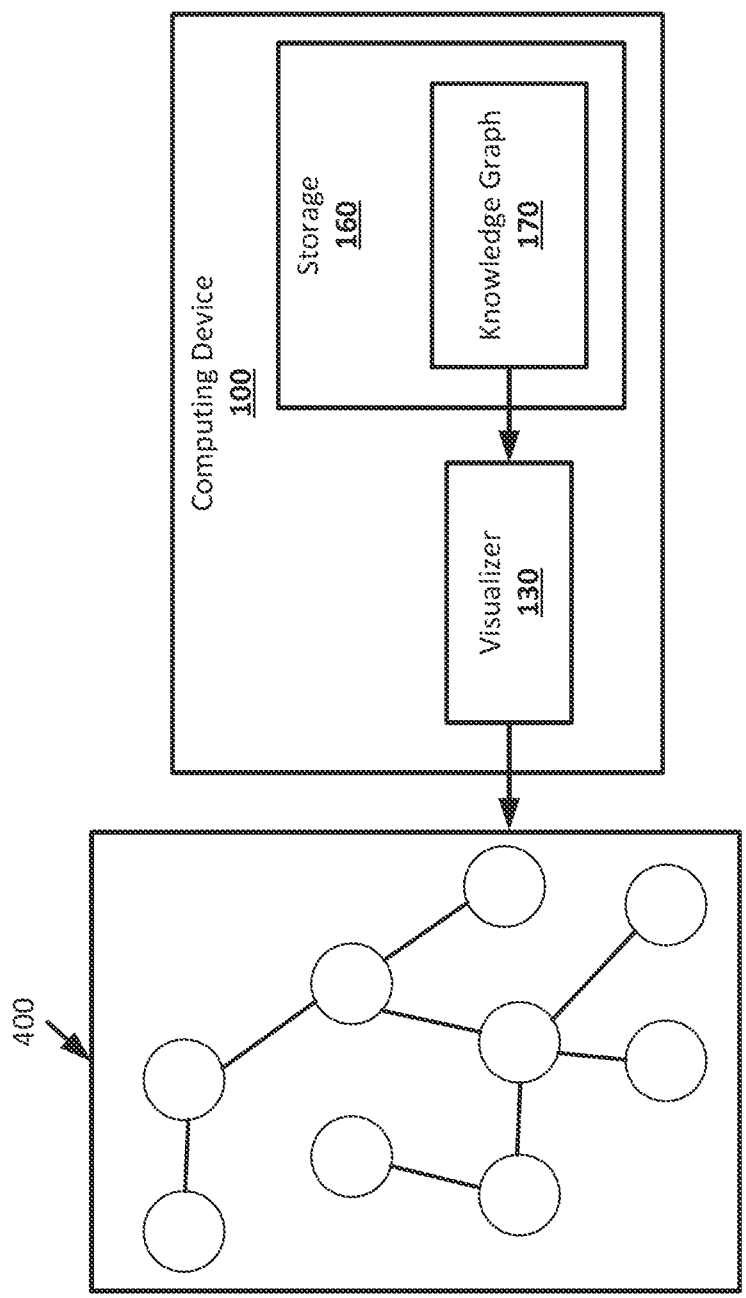
FIG. 4 shows an example arrangement suitable for maintaining service availability according to an implementation of the disclosed subject matter.

FIG. 4 shows an example arrangement suitable for maintaining service availability according to an implementation of the disclosed subject matter. The visualizer 130 may use knowledge graph 170 to generate the graph 400, which may be a visual representation of the graph in the knowledge graph 170, including, for example, connections between service instances and policies that permit the connections. The visualizer 130 may generate the graph 400 in any suitable manner and the graph 400 may be displayed on any suitable display device in communication with the computing device 100.

Figure 5:
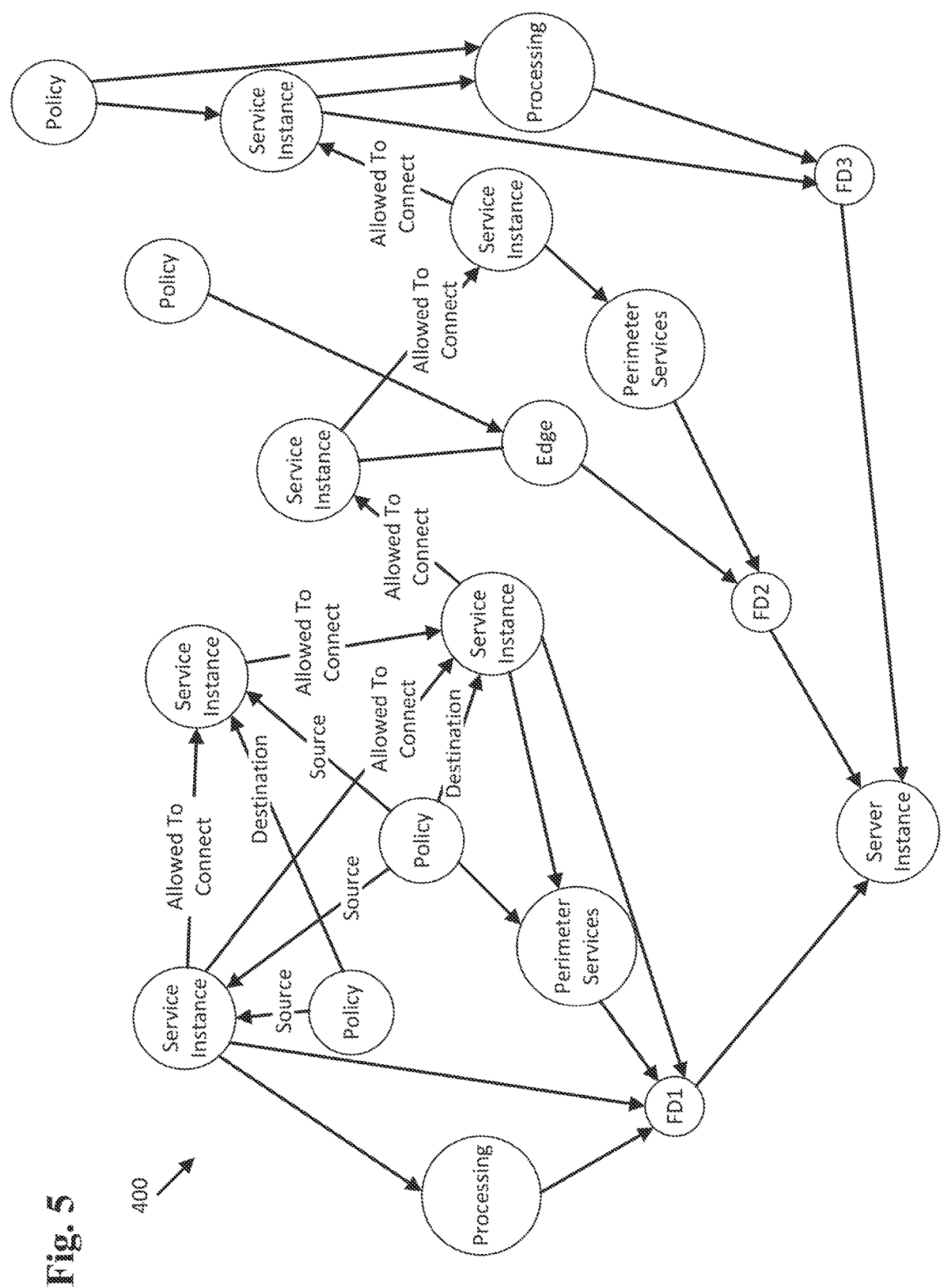
FIG. 5 shows an example arrangement suitable for maintaining service availability according to an implementation of the disclosed subject matter.

FIG. 5 shows an example arrangement suitable for maintaining service availability according to an implementation of the disclosed subject matter. The graph 400 may be a visual representation of the knowledge graph 170. Nodes representing service instances may be connected to each other, representing service instances that are allowed to connect to each other, and to nodes representing the policies that permit the connections between the service instances. The graph 400 may also include a representation of the hierarchical structure of the server instance that the applications, for example, applications 200, 210, and 230, are a part of on the cloud computing server system, for example, the server system 350. The server instance may be divided into three functional domains, FD1, FD2, and FD3, which may include perimeter services, processing services, and edge services that may be connected to the service instances of the applications.

Figure 6:
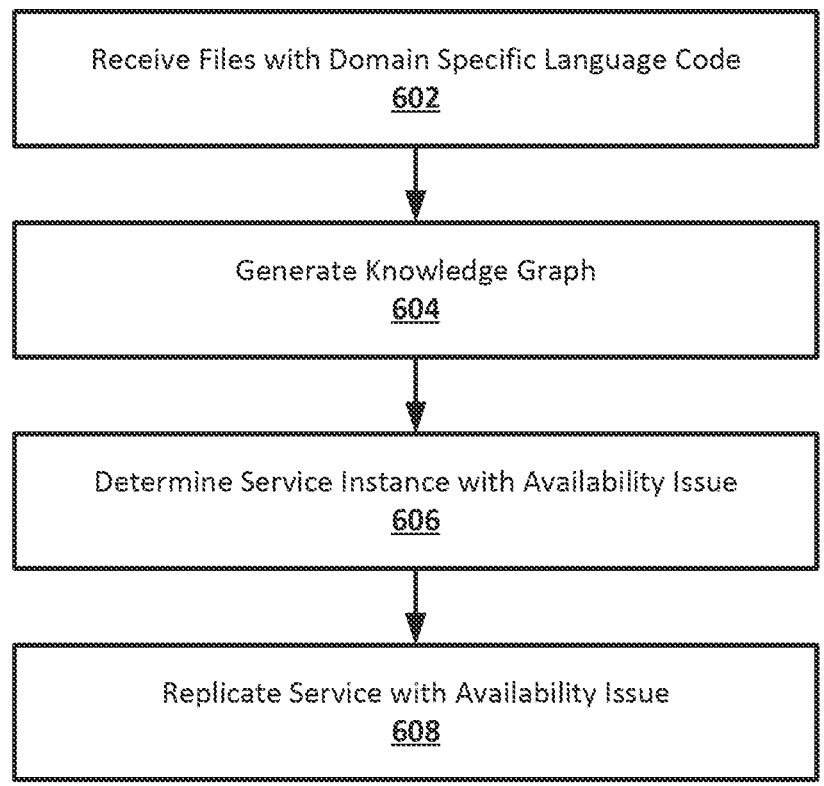
FIG. 6 shows an example procedure suitable for maintaining service availability according to an implementation of the disclosed subject matter.

FIG. 6 shows an example procedure suitable for maintaining service availability according to an implementation of the disclosed subject matter. At 602, files with code written in a domain specific language may be received. For example, during the installation of the applications 200, 210, and 220, or instances thereof, on a cloud computing server system, the computing device 100 may receive the domain specific language files 201, 211, and 221, which may be stored with the domain specific language files 161. The domain specific language files 201, 211, and 221 may include code written in a domain specific language that may be an intent based language used to define network security policies for the applications 200, 210, and 220, or the instances thereof, on the cloud computing server system.

At 604, a knowledge graph may be generated. For example, the graph generator 110 may use the domain specific language files 161, including, for example, the domain specific language files 201, 211, and 221 to generate the knowledge graph 170. The knowledge graph 170 may include graph data for the connections between service instances and the policies that allow those connections. The policies included in the knowledge graph 170 may be network security policies that are defined by the code in the domain specific language files 161, and the connections between service instances may be determined based on these network security policies due to the cloud computing server system operating on a zero trust security model. The only connections between service instances that may be permitted, and therefore represented in the knowledge graph 170, may be those that are allowed by the network security policies defined by the domain specific language files 161.

At 606, it may be determined from the knowledge graph that a service may experience an availability issue. For example, the graph analytics performed on the knowledge graph 170 by the graph analyzer 120 may determine that one of the service instances, for example, the service instance 311, may experience an availability issue based on the connections between that service instance and other service instances as represented in the knowledge graph 170. The determination may be based on the service instance having too many allowed incoming connections, having connections that will carry too much traffic, or any other suitable condition that may result in the service instance failing or otherwise becoming unavailable that may be determined from the knowledge graph 170. For example, a service instance may have a threshold number of incoming connections that the service instance may be able to handle while still maintain availability based on the service provided by the service instance and the computational resources available to the service instance. A service instance that has a number of incoming connections that exceed this threshold may be considered to have an availability issue.

At 608, the service instance that may have availability issue may be replicated. For example, the graph analyzer 120 may have determined that the service instance 311 may have an availability issue. The graph analyzer 120 may send an indication to the application 210, which owns the service instance 311, that the service instance 311 may have an availability issue. The application 210 may replicate the service instance 311, for example, starting the service instance 313 which may be a replica of the service instance 311. Some of the incoming connections to the service instance 311 may be redirected to the service instance 313 to prevent the service instance 311 from having an availability issue. The replication of the service instance may occur before the availability issue occurs, and may, for example, occur before the service instance 311 has started running or has been permitted to allow any incoming connections.

Figure 7:
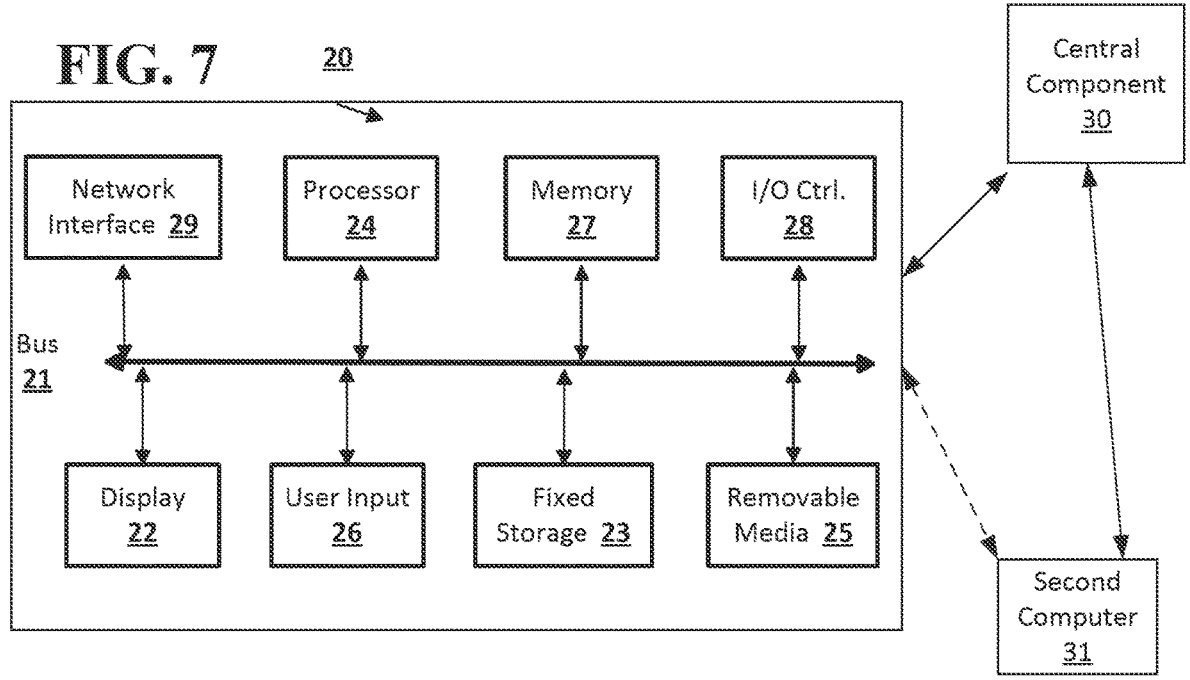
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, widearea, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
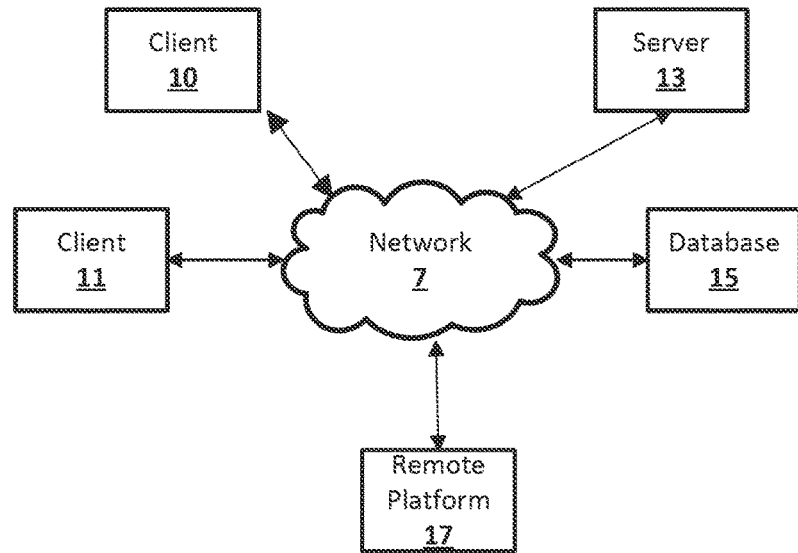
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
  receiving, at a computing device, files comprising code written using a Domain Specific Language (DSL) for network security;
  generating, by the computing device, from the code written using the DSL in the files a knowledge graph comprising one or more connections between services;
  determining, by the computing device, from the knowledge graph that at least one service will have an availability issue based on the connections between services in the knowledge graph; and
  replicating, by the computing device, the at least one service that will have the availability issue.

2. The computer-implemented method of claim 1, wherein the replicating, by the computing device, the at least one service that will have the availability issue, occurs before the at least one service has the availability issue.

3. The computer-implemented method of claim 1, wherein the availability issue for the service comprises the service having more incoming connections than a threshold number of connections for the service.

4. The computer-implemented method of claim 1, wherein the service comprises a service of an application on a cloud computing server system.

5. The computer-implemented method of claim 1, wherein the files comprising code written using the DSL are received during installation of applications on a cloud computing server system.

6. The computer-implemented method of claim 1, wherein the knowledge graph further comprises policies defined in the files comprising written using the DSL.

7. The computer-implemented method of claim 6, wherein the policies are network security policies the allow connections between services.

8. A computer-implemented system comprising:
  a storage; and
  a processor that receives files comprising code written using a Domain Specific Language (DSL) for network security,
  generates from the code written using the DSL in the files a knowledge graph comprising one or more connections between services;
  determines from the knowledge graph that at least one service will have an availability issue based on the connections between services in the knowledge graph; and
  replicates the at least one service that will have the availability issue.

9. The computer-implemented system of claim 8, wherein the replicating, by the computing device, the at least one service that will have the availability issue, occurs before the at least one service has the availability issue.

10. The computer-implemented system of claim 8, wherein the availability issue for the service comprises the service having more incoming connections than a threshold number of connections for the service.

11. The computer-implemented system of claim 8, wherein the service comprises a service of an application on a cloud computing server system.

12. The computer-implemented system of claim 8, wherein the files comprising code written using the DSL are received during installation of applications on a cloud computing server system.

13. The computer-implemented system of claim 8, wherein the knowledge graph further comprises policies defined in the files comprising written using the DSL.

14. The computer-implemented system of claim 13, wherein the policies are network security policies the allow connections between services.

15. A system comprising: one or more computers and one or more non-transitory storage devices storing instructions which are operable, when executed by the one or more computers, to cause the one or more computers to perform operations comprising:
  receiving, at a computing device, files comprising code written using a Domain Specific Language (DSL) for network security;
  generating, by the computing device, from the code written using the DSL in the files a knowledge graph comprising one or more connections between services;
  determining, by the computing device, from the knowledge graph that at least one service will have an availability issue based on the connections between services in the knowledge graph; and
  replicating, by the computing device, the at least one service that will have the availability issue.

16. The system of claim 15, wherein the replicating, by the computing device, the at least one service that will have the availability issue, occurs before the at least one service has the availability issue.

17. The system of claim 15, wherein the availability issue for the service comprises the service having more incoming connections than a threshold number of connections for the service.

18. The system of claim 15, wherein the service comprises a service of an application on a cloud computing server system.

19. The system of claim 15, wherein the files comprising code written using the DSL are received during installation of applications on a cloud computing server system.

20. The system of claim 15, wherein the knowledge graph further comprises policies defined in the files comprising written using the DSL.

* * * * *